US012252107B2

(12) United States Patent
Matschke et al.

(10) Patent No.: US 12,252,107 B2
(45) Date of Patent: Mar. 18, 2025

(54) METHOD AND CONTROL UNIT FOR OPERATING A TRACTOR-TRAILER COMBINATION MADE UP OF A TOWING VEHICLE AND A TRAILER INCLUDING AN OVERRUN BRAKE

(71) Applicant: Robert Bosch GmbH, Stuttgart (DE)

(72) Inventors: Thomas Matschke, Bietigheim-Bissingen (DE); Florian Stratz, Hemmingen (DE); Ralph Goll, Hemmingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/769,802

(22) PCT Filed: Sep. 28, 2020

(86) PCT No.: PCT/EP2020/077059
§ 371 (c)(1),
(2) Date: Apr. 18, 2022

(87) PCT Pub. No.: WO2021/104716
PCT Pub. Date: Jun. 3, 2021

(65) Prior Publication Data
US 2022/0355772 A1    Nov. 10, 2022

(30) Foreign Application Priority Data

Nov. 28, 2019   (DE) .................... 10 2019 218 516.9

(51) Int. Cl.
*B60T 8/17*      (2006.01)
*B60T 7/20*      (2006.01)
(Continued)

(52) U.S. Cl.
CPC .............. *B60T 8/1708* (2013.01); *B60T 7/20* (2013.01); *B60T 8/1766* (2013.01); *B60T 13/08* (2013.01); *B60T 2250/02* (2013.01)

(58) Field of Classification Search
CPC ........ B60T 8/1708; B60T 7/20; B60T 8/1766; B60T 13/08; B60T 2250/02
See application file for complete search history.

(56) References Cited

U.S. PATENT DOCUMENTS 5,549,364 A * 8/1996 Mayr-Frohlich ...... B60T 8/1708
                                                         303/9.69
5,610,372 A * 3/1997 Phillips ................ G01G 19/414
                                                         177/25.14

(Continued)

FOREIGN PATENT DOCUMENTS

CN         87103324 A       11/1988
CN         107264493 A      10/2017
(Continued)

OTHER PUBLICATIONS

International Search Report for PCT/EP2020/077059, Issued Dec. 17, 2020.

*Primary Examiner* — Abby J Flynn
*Assistant Examiner* — Paulo Roberto Gonzalez Leite
(74) *Attorney, Agent, or Firm* — NORTON ROSE FULBRIGHT US LLP; Gerard A. Messina

(57) ABSTRACT

A method for operating a tractor-trailer combination made up of a towing vehicle and a trailer including an overrun brake. A total weight of the tractor-trailer combination is ascertained using a drive torque of the towing vehicle and an acceleration of the tractor-trailer combination. A trailer braking effect of the overrun brake is determined using a deceleration of the tractor-trailer combination, the total weight, and a vehicle braking effect of the towing vehicle (Continued)

without the trailer. A brake force distribution of the towing vehicle is set using the trailer braking effect.

9 Claims, 1 Drawing Sheet

(51) Int. Cl.
    *B60T 8/1766*      (2006.01)
    *B60T 13/08*      (2006.01)

(56) References Cited

U.S. PATENT DOCUMENTS

| | | | |
|---|---|---|---|
| 7,134,733 B2* | 11/2006 | Eckert | B60T 13/683 |
| | | | 303/9.69 |
| 2006/0071549 A1* | 4/2006 | Chesnut | B60T 7/16 |
| | | | 303/3 |
| 2007/0216220 A1 | 9/2007 | Beijersbergen Van Henegouwen et al. | |
| 2014/0046566 A1* | 2/2014 | Maitlen | B60T 8/1701 |
| | | | 701/70 |
| 2014/0343813 A1* | 11/2014 | Morselli | B60T 13/686 |
| | | | 180/14.1 |
| 2016/0009288 A1* | 1/2016 | Yu | B60T 8/1708 |
| | | | 701/1 |
| 2019/0016314 A1* | 1/2019 | Sanders | B60T 13/662 |
| 2019/0184950 A1* | 6/2019 | Williams | B60T 7/20 |

FOREIGN PATENT DOCUMENTS

| | | |
|---|---|---|
| CN | 108466610 A | 8/2018 |
| CN | 109661334 A | 4/2019 |
| DE | 4412430 C1 | 8/1995 |
| DE | 4446358 C1 | 12/1995 |
| DE | 19519768 A1 | 12/1996 |
| DE | 102008019592 A1 | 10/2009 |
| DE | 202012009953 U1 | 1/2013 |
| DE | 102016110836 A1 | 12/2017 |
| EP | 1612081 A1 | 1/2006 |
| EP | 2384941 A1 | 11/2011 |
| GB | 1414050 A | 11/1975 |

\* cited by examiner

METHOD AND CONTROL UNIT FOR OPERATING A TRACTOR-TRAILER COMBINATION MADE UP OF A TOWING VEHICLE AND A TRAILER INCLUDING AN OVERRUN BRAKE

FIELD

The present invention relates to a method for operating a tractor-trailer combination made up of a towing vehicle and a trailer including an overrun brake and a corresponding control unit.

BACKGROUND INFORMATION

In a tractor-trailer combination made up of a towing vehicle and a braked trailer including an overrun brake, the trailer is mounted relatively movably with regard to the towing vehicle within the overrun brake in a longitudinal direction. During a braking operation, the trailer overruns to the towing vehicle due to an inertia of the trailer. The overrun brake transfers a thrust acting in this case at least proportionally to the wheel brakes of the trailer and decelerates the trailer. A resulting braking effect of the wheel brakes reduces the thrust and the towing vehicle is pushed by the trailer to a lesser extent. Depending on the condition of the overrun brake and/or the wheel brakes, the braking effect varies as a result and the towing vehicle is thus affected differently.

SUMMARY

The present invention provides a method for operating a tractor-trailer combination made up of a towing vehicle and a trailer including an overrun brake and a corresponding control unit as well as finally a corresponding computer program product and a machine-readable memory medium. Advantageous refinements and improvements of the present invention result from the disclosure herein.

Specific embodiments of the present invention may advantageously make it possible to monitor the condition of the overrun brake or of the wheel brakes of the trailer and to correspondingly set a brake force distribution of the towing vehicle to optimize a total braking effect of the tractor-trailer combination.

In accordance with an example embodiment of the present invention, a method for operating a tractor-trailer combination made up of a towing vehicle and a trailer including an overrun brake is provided, a total weight of the tractor-trailer combination being ascertained using a drive torque of the towing vehicle and an acceleration of the tractor-trailer combination, a trailer braking effect of the overrun brake being ascertained using a deceleration of the tractor-trailer combination, the ascertained total weight and a vehicle braking effect of the towing vehicle without the trailer, and a brake force distribution of the vehicle being set using the ascertained trailer braking effect.

Features of specific embodiments of the present invention may be considered, inter alia, to be based on the thoughts and findings described in the following.

A towing vehicle may be a vehicle having a trailer hitch. A vehicle that is intended to tow a trailer in the future, is towing the trailer right now or is connected to the trailer, or has previously towed the trailer, or was connected to the trailer may be referred to as a towing vehicle. A tractor-trailer combination includes the towing vehicle and the trailer. The trailer may be a transport trailer or a caravan trailer, for example.

An overrun brake may enable a relative movement between the trailer and the towing vehicle in a longitudinal direction of the trailer. The trailer may approach the towing vehicle during a braking operation within a movement clearance of the overrun brake. The approach may be referred to as overrun. The overrun brake may use the relative movement to decelerate the trailer. During the overrun, a rod that is connected to the trailer hitch of the towing vehicle is pushed into a towing bar unit of the overrun brake and thus actuates the wheel brakes of the trailer via a mechanical or hydraulic gear ratio, for example. The stronger the towing vehicle brakes during the braking operation and the heavier the trailer, the greater is a braking effect at the trailer.

An acceleration, when accelerating the tractor-trailer combination, depends on a provided drive torque of the towing vehicle, losses of the tractor-trailer combination, and a total weight of the tractor-trailer combination. The drive torque is known. The acceleration may be derived from a change in the speed of the towing vehicle. The losses may be stored as estimated values. The available values may be used to at least roughly compute or estimate the total weight.

A deceleration of the tractor-trailer combination may also be derived from a change in speed. A total braking effect of the towing vehicle and the overrun brake may be computed from the deceleration and the total weight. A vehicle braking effect may be stored in the control unit. The vehicle braking effect may be checked during a driving operation of the towing vehicle without the trailer. The trailer braking effect may be determined from a difference of the total braking effect and the vehicle braking effect.

As a result of the trailer braking effect, there is additional supporting force on the trailer hitch. The additional supporting force adds to an axle load on a rear axle of the towing vehicle. The additional supporting force results from a braking torque of the wheel brakes of the trailer, among other things. The braking torque may be derived from the trailer braking effect. As a result of the additional supporting load, a brake pressure may be increased at the wheels of the rear axle of the towing vehicle and the tractor-trailer combination may thus be decelerated faster overall.

Furthermore, the total weight may be ascertained using a piece of information about a rolling resistance of the tractor-trailer combination. The rolling resistance makes up a large portion of the losses of the tractor-trailer combination. The rolling resistance may be estimated using a change in the speed of the tractor-trailer combination when rolling or driving without braking and accelerating.

Furthermore, the total weight may be ascertained using a piece of information about a grade under the tractor-trailer combination. The grade may be read out from a piece of terrain information, such as for example from map data, using a position of the tractor-trailer combination. The grade may be positive or negative. On the grade, a grade resistance may act against or in line with the drive torque. The tractor-trailer combination may be accelerated going downhill. The tractor-trailer combination may be decelerated going uphill. The grade may also be determined by an inclination sensor of the towing vehicle.

Furthermore, the total weight may be ascertained using a piece of present wind information. The tractor-trailer combination may be decelerated in the case of headwind. The tractor-trailer combination may be accelerated in the case of tailwind. A wind resistance at least of the towing vehicle is known. The piece of wind information may be included in the piece of weather information. Likewise, the piece of wind information may be ascertained by at least one sensor of the towing vehicle. For example, a rotational speed of a blower wheel may be evaluated.

In accordance with an example embodiment of the present invention, when ascertaining the total weight, a temperature at the overrun brake may be supervised. The temperature may be supervised and a warning may be provided when the temperature is too high. The warning may be provided when the temperature is higher than a predetermined value. In the case of a slipping wheel brake, heat may develop due to friction. The friction decelerates the tractor-trailer combination and is part of the losses. A temperature sensor that may be read out by the towing vehicle via a data bus, for example, may be integrated into the wheel brakes of the trailer in each case. By supervising the temperature, a defect at the wheel brake may be quickly detected.

The trailer braking effect may be supervised, for example permanently, periodically and/or in an occasion-controlled manner. A warning may be provided when the trailer braking effect is too low. The warning may be provided when the trailer braking effect is lower than a predetermined value. For example, the warning may be provided following a minor number of braking operations. As a result of the warning, a driver of the towing vehicle may control the overrun brake, detect a potential defect at the overrun brake, and remedy it, if needed.

The brake force distribution may further be set using a trailer weight ascertained using the total weight and a vehicle weight of the towing vehicle. The brake force distribution refers in this case to a distribution of the brake forces, brought about overall in the towing vehicle, by an appropriately distributed activation of the wheel brakes provided at the multiple wheels of the towing vehicle. With each braking operation, the trailer weight brings about a moment of inertia, which is supported on the trailer hitch in addition to the braking torque. The moment of inertia is a function of a position of center of gravity of a center of gravity of the trailer and the trailer weight. At least the trailer weight may be estimated in the course of the determination of the total weight. The moment of inertia may result in an additional increase in the brake pressure.

The method may, for example, be implemented in software or hardware or in a mix of software and hardware, for example in a control unit.

The present invention furthermore provides a control unit which is designed to carry out, control or implement in appropriate devices the steps of one of the variants of the method presented here.

The control unit may be an electrical unit including at least one processing unit for processing signals or data, at least one memory unit for storing signals or data, and at least one interface and/or communication interface for reading in or outputting data embedded in a communication protocol. The processing unit may be, for example, a signal processor, a so-called system ASIC, or a microcontroller for processing sensor signals and outputting data signals as a function of the sensor signals. The memory unit may be, for example, a flash memory, an EPROM, or a magnetic memory unit. The interface may be designed as a sensor interface for reading in sensor signals from a sensor and/or as an actuator interface for outputting data signals and/or control signals to an actuator. The communication interface may be designed to read in or output the data in a wireless and/or hardwired manner. The interfaces may also be software modules which are present on a microcontroller alongside other software modules, for example. The control unit may be a part of a brake controller of the towing vehicle or cooperate with same.

A computer program product or a computer program having program code is also advantageous, which may be stored on a machine-readable carrier or a memory medium, such as a semiconductor memory, a hard disk memory, or an optical memory, and is used to carry out, implement and/or activate the steps of the method according to one of the specific embodiments described above, in particular when the program product or the program is run on a computer or a device.

It is pointed out that some of the possible features and advantages of the present invention are described here with reference to different specific embodiments. Those skilled in the art, in view of the disclosure herein, may recognize that the features of the control unit and the method may be combined, adapted, or exchanged in a suitable manner in order to achieve other specific embodiments of the present invention.

BRIEF DESCRIPTION OF THE DRAWINGS

Specific embodiments of the present invention are described below with reference to the figure, while neither the figure nor the description is to be interpreted as limiting to the present invention.

The figure is only schematic and not true to scale. Identical reference numerals identify identical features or features of identical functionality.

DETAILED DESCRIPTION OF EXAMPLE EMBODIMENTS

Figure 1:
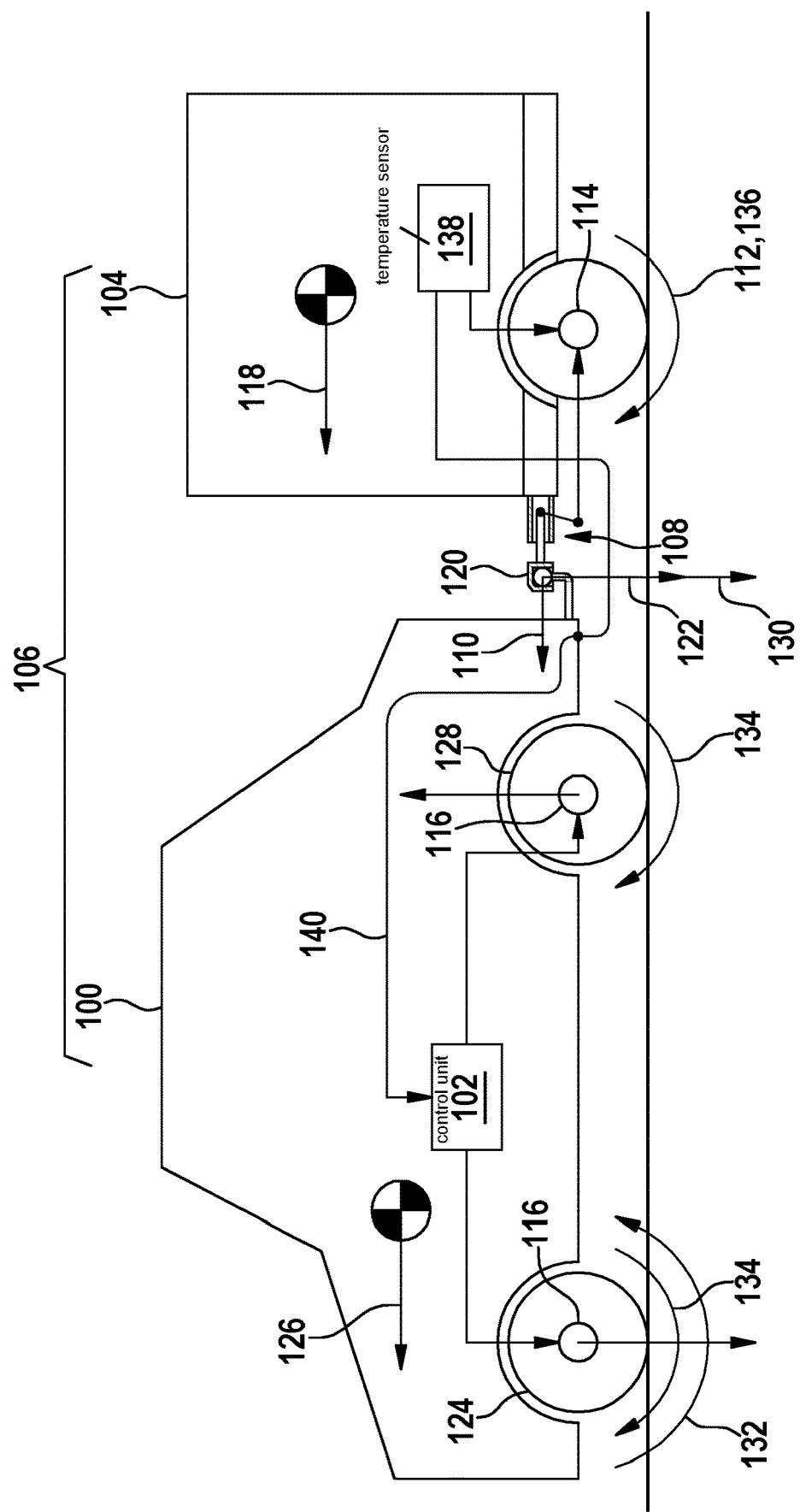
FIG. 1 shows an illustration of a braking operation of a tractor-trailer combination made up of a towing vehicle, including a control unit according to one exemplary embodiment of the present invention, and a trailer.

FIG. 1 shows an illustration of a towing vehicle 100 including a control unit 102 according to one exemplary embodiment. Towing vehicle 100 tows a trailer 104. Together, towing vehicle 100 and trailer 104 form a tractor-trailer combination 106. Trailer 104 has an overrun brake 108. Overrun brake 108 converts a thrust 110 of the trailer during a braking operation of the tractor-trailer combination into a braking torque 112 at wheel brakes 114 of trailer 104.

During the braking operation, a brake pressure is built up at brakes 116 of towing vehicle 100 and towing vehicle 100 is decelerated. An inertia 118 of trailer 104 makes trailer 104 overrun to towing vehicle 100. Trailer 104 pushes at a trailer hitch 120 of towing vehicle 100 using thrust 110. Thrust 110 is partially transferred to wheel brakes 114 of trailer 104 and generates there braking torque 112. Braking torque 112 is supported as supporting force 122 on trailer hitch 120 of towing vehicle 100.

During the braking operation, a front axle 124 of the towing vehicle is subjected to a load by an inertia 126 of towing vehicle 100 and a rear axle 128 of towing vehicle 100 is relieved. As a result, at least during braking operations without trailer 104, a brake force distribution is set in such a way that at front axle 124 greater brake pressure is applied than at rear axle 128. For example, a ratio of 70:30 may be set between the brake pressures. Supporting force 122 on trailer hitch 120 counteracts the relief of rear axle 128. Inertia 118 of trailer 104 brings about an additional supporting force 130 on trailer hitch 120. As a result of additional supporting force 130, the relief of rear axle 128 is further counteracted.

In the case of the approach presented here, an effect of overrun brake 108 is monitored by control unit 102 and a brake pressure distribution between front axle 124 and rear axle 128 of towing vehicle 100 is set taking into account the effect when trailer 104 is hitched to towing vehicle 100. Here, the ratio of the brake pressure distribution is changed and set to 60:40, for example.

For the purpose of detecting the effect of overrun brake 108, a total weight of tractor-trailer combination 106 is initially ascertained in control unit 102. The total weight is ascertained during the acceleration of tractor-trailer combination 106, since during an acceleration operation of the tractor-trailer combination the information needed to ascertain the total weight is available. A drive torque 132 at the driven axles of towing vehicle 100 may be read out from an engine control unit of towing vehicle 100. A piece of acceleration information representing the acceleration of tractor-trailer combination 106 may be derived from a piece of speed information of a speed sensor of the towing vehicle. A total mass or the total weight of the tractor-trailer combination may be ascertained from drive torque 132 and the acceleration.

During a braking operation, a total braking effect of the tractor-trailer combination is made up of a vehicle braking effect 134 and braking torque 112 of trailer 104, which is referred to as trailer braking effect 136. Vehicle braking effect 134 without trailer 104 is known. The total braking effect is determined during the braking operation. For this purpose, a piece of deceleration information representing the deceleration of tractor-trailer combination 106 is derived from the piece of speed information. Using the total weight and the deceleration, it is possible to determine the total braking effect in control unit 102. A difference between the total braking effect and vehicle braking effect 134 corresponds to trailer braking effect 136. Trailer braking effect 136 or braking torque 112 brings about supporting force 122.

Drive torque 132 is influenced by a rolling resistance of tractor-trailer combination 106. The rolling resistance may be a function of the tire pressures at towing vehicle 100 and trailer 104. The rolling resistance may be, for example, ascertained during a driving operation without acceleration using drive torque 132. Likewise, the rolling resistance may be ascertained during a powerless rolling using a speed change. In one exemplary embodiment, the total mass of tractor-trailer combination 106 is ascertained taking into account the rolling resistance.

Drive torque 132 is influenced by an uphill grade or a downhill grade of the road. Tractor-trailer combination 106 requires additional drive torque 132 when going uphill and less drive torque 132 when going downhill to reach the same degree of acceleration as on a planar surface. In one exemplary embodiment, the computation of the total weight thus further takes into account the uphill grade or the downhill grade of the road under tractor-trailer combination 106. The uphill grade or the downhill grade may be measured by an inclination sensor of towing vehicle 100. Alternatively, the uphill grade or the downhill grade may be read out from the map data of the navigation system.

Drive torque 132 is influenced by headwind and tailwind. Tractor-trailer combination 106 requires additional drive torque 132 when going against the wind and less drive torque 132 when going in the direction of the wind to reach the same degree of acceleration as in still air. In one exemplary embodiment, the computation of the total weight thus further takes into account a piece of wind information. The piece of wind information may be read out from the piece of weather information. Alternatively, towing vehicle 100 may include a wind detection device that provides the piece of wind information.

In one exemplary embodiment, wheel brakes 114 of trailer 106 include a temperature sensor 138 in each case. Temperature sensor 138 provides control unit 102 with a temperature signal 138 indicating a temperature of wheel brake 114. An increased temperature of wheel brakes 114 is caused by friction in wheel brakes 114. A permanently increased temperature is an indication for slipping wheel brakes 114. The slipping may falsify the computation of the total weight, since as a result of the slipping an increased drive torque 132 is needed to accelerate tractor-trailer combination 106. If the temperature only increases during the braking operation and then drops again, a normal function of the wheel brakes may be deduced. If, during a braking operation, the temperature does not increase to an expected value, an insufficient braking torque 112 of the wheel brakes may be deduced. Temperature signal 138 is monitored in control unit 102. On the one hand, the function of overrun brake 108 may thus be monitored and on the other hand, a falsified setup of the brake force distribution may be prevented. In the case of a defect of overrun brake 108, a driver of towing vehicle 100 may be warned.

In one exemplary embodiment, the trailer braking effect determined in control unit 102 is monitored. Here, the actual trailer braking effect is compared to an expected trailer braking effect and a warning is provided if the actual trailer braking effect is smaller than the expected trailer braking effect.

In other words, a diagnosis for an overrun brake of a caravan or trailer and an adaptation of the brake pressure at the rear axle of the passenger car is presented.

Trailers are sometimes used only very irregularly. Heavy trailers have an overrun brake. Standing still for a long period of time may damage the overrun brake. The effect deteriorates in this case. The piece of information about the roadway inclination and the present wind situation is available online.

With the aid of the approach presented here, the strength of the overrun brake of a trailer may be automatically diagnosed. Accidents as a result of defective overrun brakes at trailers may thus be prevented.

In a first phase, learning takes place. During a normal driving operation without a trailer, the correlation between applied brake pressure at the brake disks of a vehicle and deceleration may be learned.

In a second phase, the weight of the tractor-trailer combination is ascertained. It is initially established on a straight section, whether the overrun brake of the caravan slips. For this purpose, the tractor-trailer combination deceleration is compared during a rolling operation to an expected tractor-trailer combination deceleration in the case of an almost straight section, on which the overrun brake does not work.

The wind situation, the road inclination, and the CD value of the vehicle are known to the system.

Since increased heat develops as a result of permanent slipping, this temperature change is monitored by a temperature sensor at the overrun brake in one exemplary embodiment.

In a second step, the vehicle itself may now determine the approximate weight of the tractor-trailer combination. For this purpose, the presently applied drive torque is read out on the roadway from the control unit. With the aid of acceleration, the total mass may now be determined from $F=m*a$.

The wind situation as well as the grade of the route and Cw*v are also incorporated. The result is thus a total mass of the tractor-trailer combination.

In a third phase, a diagnosis of the brake takes place. The overrun brake is intended to reduce a pushing of the vehicle by the trailer. In the vehicle, the brake pressure at the individual brake disks is known. During a normal driving operation without a trailer, the correlation between applied brake pressure at the brake disks and deceleration is already known.

If the trailer is now hitched, it is known in a deceleration operation, since the total mass of the tractor-trailer combination is known from the second phase, how much total braking effect is applied. If the braking effect of the vehicle brake is subtracted, the result represents how much braking effect the trailer itself is applying. A statement may thus be made as to how much braking effect originates from the overrun brake.

In a fourth phase, the brake torque of the rear axle of the vehicle is temporarily increased, since a brake torque that is applied at the trailer or caravan increases the contact pressure of the passenger car rear axle on the road. The result is an improved effect on the deceleration of the tractor-trailer combination.

The system requires information from the engine control unit, the brake control unit, and the Cloud. The brake functions may run in the brake control unit.

Every vehicle towing a caravan, for example, may be equipped with the approach presented here. A temperature sensor for diagnosis may be integrated into the overrun brake as a component.

Finally, it is to be noted that terms such as "having," "including," etc. do not exclude any other elements or steps and terms such as "a" or "an" do not exclude a plurality. Reference numerals are not to be considered as limitations.

What is claimed is:

1. A method for operating a tractor-trailer combination made up of a towing vehicle and a trailer including an overrun brake, the method comprising the following steps:
    ascertaining a total weight of the tractor-trailer combination using a drive torque of the towing vehicle and an acceleration of the tractor-trailer combination;
    ascertaining a trailer braking effect of the overrun brake using a deceleration of the tractor-trailer combination, the ascertained total weight, and a known vehicle braking effect of the towing vehicle without the trailer that corresponds to a learned correlation between applied brake pressure at brake disks of the towing vehicle and deceleration during a driving operation without the trailer;
    setting a brake force distribution of the towing vehicle using the ascertained trailer braking effect by changing, on the basis of the ascertained trailer braking effect, a predetermined brake pressure ratio between a front axle of the towing vehicle that exists without the trailer and a rear axle of the towing vehicle to a different brake pressure ratio between the front axle of the towing vehicle and the rear axle of the towing vehicle for the tractor-trailer combination; and
    controlling the operating of the tractor-trailer so that the tractor-trailer is braked in accordance with the brake force distribution.

2. The method as recited in claim 1, wherein the total weight is ascertained using a rolling resistance of the tractor-trailer combination.

3. The method as recited in claim 1, wherein the total weight is ascertained using a grade under the tractor-trailer combination.

4. The method as recited in claim 1, wherein the total weight is ascertained using a piece of present wind information.

5. The method as recited in claim 1, wherein when ascertaining the total weight, a temperature at the overrun brake is monitored and a warning is provided when the temperature is too high.

6. The method as recited in claim 1, wherein the trailer braking effect is monitored and a warning is provided when the trailer braking effect is too low.

7. The method as recited in claim 1, wherein the brake force distribution is set using a trailer weight ascertained using the total weight and a vehicle weight of the towing vehicle.

8. A control unit configured to operate a tractor-trailer combination made up of a towing vehicle and a trailer including an overrun brake, the control unit configured to:
    ascertain a total weight of the tractor-trailer combination using a drive torque of the towing vehicle and an acceleration of the tractor-trailer combination;
    ascertain a trailer braking effect of the overrun brake using a deceleration of the tractor-trailer combination, the ascertained total weight, and a known vehicle braking effect of the towing vehicle without the trailer that corresponds to a learned correlation between applied brake pressure at brake disks of the towing vehicle and deceleration during a driving operation without the trailer;
    set a brake force distribution of the towing vehicle using the ascertained trailer braking effect by changing, on the basis of the ascertained trailer braking effect, a predetermined brake pressure ratio between a front axle of the towing vehicle that exists without the trailer and a rear axle of the towing vehicle to a different brake pressure ratio between the front axle of the towing vehicle and the rear axle of the towing vehicle for the tractor-trailer combination; and
    control the operating of the tractor-trailer so that the tractor-trailer is braked in accordance with the brake force distribution.

9. A non-transitory machine-readable memory medium on which is stored a computer program for operating a tractor-trailer combination made up of a towing vehicle and a trailer including an overrun brake, the computer program, when executed by a processor, causing the processor to perform the following steps:
    ascertaining a total weight of the tractor-trailer combination using a drive torque of the towing vehicle and an acceleration of the tractor-trailer combination;
    ascertaining a trailer braking effect of the overrun brake using a deceleration of the tractor-trailer combination, the ascertained total weight, and a known vehicle braking effect of the towing vehicle without the trailer that corresponds to a learned correlation between applied brake pressure at brake disks of the towing vehicle and deceleration during a driving operation without the trailer;
    setting a brake force distribution of the towing vehicle using the ascertained trailer braking effect by changing, on the basis of the ascertained trailer braking effect, a predetermined brake pressure ratio between a front axle of the towing vehicle that exists without the trailer and a rear axle of the towing vehicle to a different brake pressure ratio between the front axle of the towing vehicle and the rear axle of the towing vehicle for the tractor-trailer combination; and controlling the operating of the tractor-trailer so that the tractor-trailer is braked in accordance with the brake force distribution.

* * * * *